Figure 1:
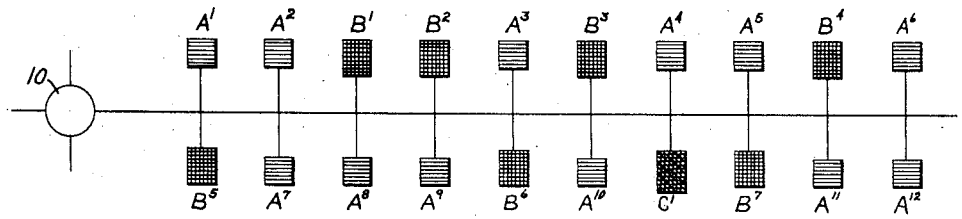

Aug. 30, 1932.  C. I. HALL  1,875,236
ELECTRIC HEATING
Filed Feb. 23, 1929  2 Sheets-Sheet 1

Inventor:
Chester I. Hall
by Charles E. Tullar
His Attorney

Aug. 30, 1932.  C. I. HALL  1,875,236
ELECTRIC HEATING
Filed Feb. 23, 1929   2 Sheets-Sheet 2
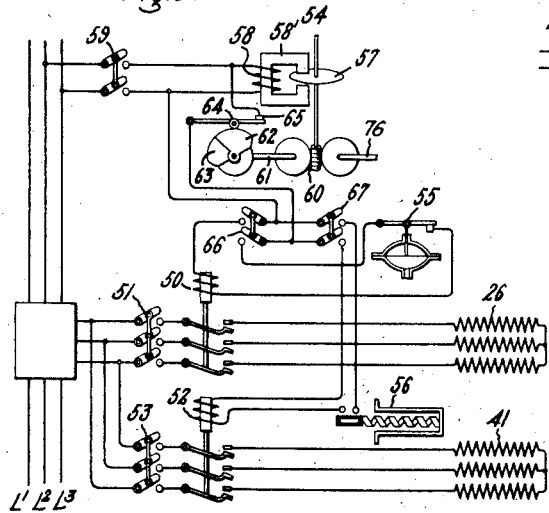
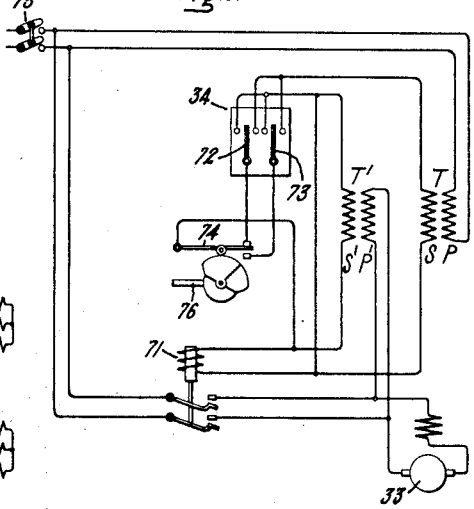
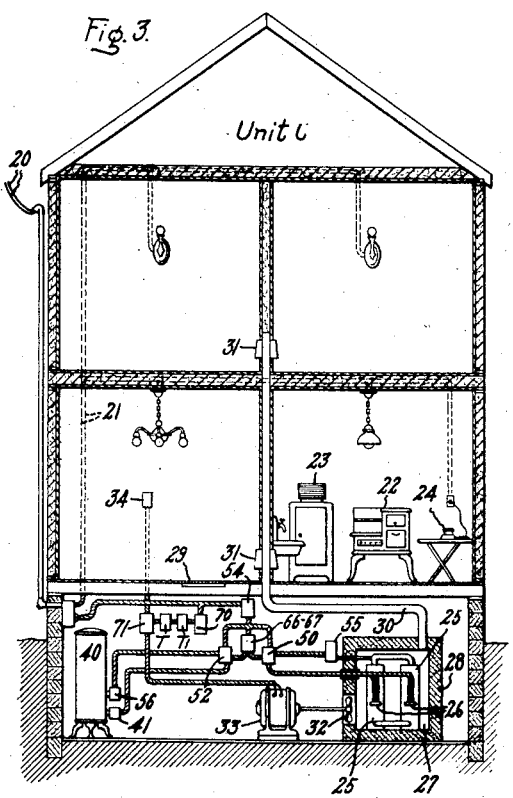
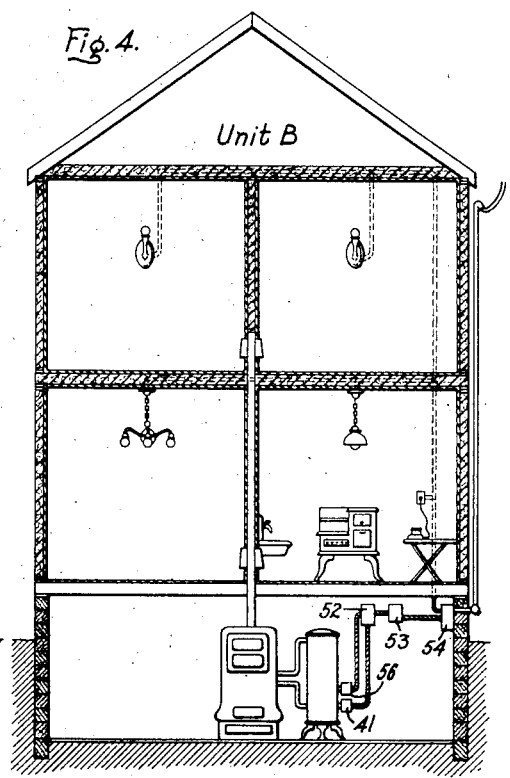
Inventor:
Chester I. Hall,
by Charles E. Tullar
His Attorney Patented Aug. 30, 1932

1,875,236

UNITED STATES PATENT OFFICE

CHESTER I. HALL, OF PHILADELPHIA, PENNSYLVANIA, ASSIGNOR TO GENERAL ELECTRIC COMPANY, A CORPORATION OF NEW YORK

ELECTRIC HEATING

Application filed February 23, 1929. Serial No. 341,870.

This invention relates to methods and apparatus for utilizing electric energy for heating purposes, particularly for heating houses and buildings as well as for water heating in order thereby to permit the off peak load capacity of electric generating stations and distribution systems to be utilized efficiently and economically.

It is well known that the central stations now supplying energy in the various communities of this country almost universally are operated at a low load factor. While in the large industrial centers the load factor may be as high as 60%, still in the numerous small residence communities where lighting forms the chief load, the load factor may be as low as 15%. The statistics recorded in the Electrical World of January 7, 1928, gives a load factor average of 30% for all the electric energy sold in the United States at an approximate yearly value of $1,783,000,000. If this average load factor is raised from 30% to 75% the additional energy sold even at one cent a kilowatt hour would represent an added income to the central stations of $1,130,000,000. Moreover, the cost of generating this additional energy would be relatively small as with water power plants having limited storage capacity, the water is necessarily wasted during the period of low demand, while with steam power plants the boilers must be banked between the periods of maximum demand with a corresponding waste of coal. Thus, with a low load factor, the interest, depreciation and general maintenance of generating plants and also the distribution systems and transforming apparatus for distributing the energy therefrom represents an excessive proportion of the cost of the electric energy actually delivered since all the generating apparatus and distributing apparatus have a load factor of only 30%.

The principal object of the present invention is to provide improved means for electric heating, particularly for electric building heating, including both domestic and commercial structures arranged so that the energy may be taken from the generating stations and distribution lines only during the period of the off peak load thereon. Furthermore, in order to equalize the seasonal demand in the use of electricity for domestic and building heating it is proposed according to the present invention to utilize the off peak capacity of the generating stations and distribution systems for heating the houses and buildings during the winter time and for heating water for domestic and building use during the summer time. Thus in the winter time the electric water heating load will be at a minimum since most of the water used will be heated by the coils ordinarily associated with the coal, oil or gas furnaces used in heating the houses and buildings. On the other hand, in the summer time both the electric house and building heating systems, as well as the other systems, will be shut down, although the daily demand for hot water continues. Thus, by proper diversity of the electric building and water heating load, the average demand on the generating station and distribution system may be maintained substantially constant throughout the year. For example, with 2% of the buildings in a community using electric heat in the winter time and electric water heating throughout the entire year, and 30 to 40% using electric water heating alone (when the coal, oil or gas house heating system is shut down for the summer) sufficient demand will be created for the off peak capacity of the ordinary generating and distribution system.

In carrying the present invention into effect, both for electric house and building heating and electric water heating, the method consists of heating large thermal storage bodies such as tanks of water, utilizing the electrical heating energy during the night hours or other periods of off peak load and releasing the heat stored in the thermal storage body to the house and to the water as and when required. The accumulation of heat in the heat storage body is automatically controlled so as to insure that only the off peak capacity of the system is used. The discharge of heat from the thermal storage body also is automatically controlled by thermostatic means arranged to maintain a constant house or hot water temperature. The manner of transferring heat from the thermal storage body to the house may be varied in accordance with whether the usual hot air, hot water, steam, or vapor house heating apparatus is used.

For hot air systems, a room thermostat may be arranged to control a small ventilating motor which serves to circulate the air of the house over the thermal storage water tanks to be heated thereby and return to the house. Likewise, for hot water systems a small circulating pump may be controlled by the room thermostat so as to deliver the hot water directly to the radiators. For double pipe steam or vapor systems a reducing valve may be arranged to be controlled by the room thermostat so as to automatically maintain the required pressure in the heating system. An alternative means of taking care of the double pipe steam or vapor systems is to utilize hot water as the radiating medium in place of steam or vapor, the temperature of the water and area of radiation being adjusted properly to heat the building.

The electric house heating arrangements of the present invention require practically no operating attention or labor, are absolutely clean, simple and reliable, and also due to the automatic control are entirely safe, and moreover require practically no additional investment for generating equipment or distributing equipment since energy is used only during the ordinary off peak load periods.

Figure 2:
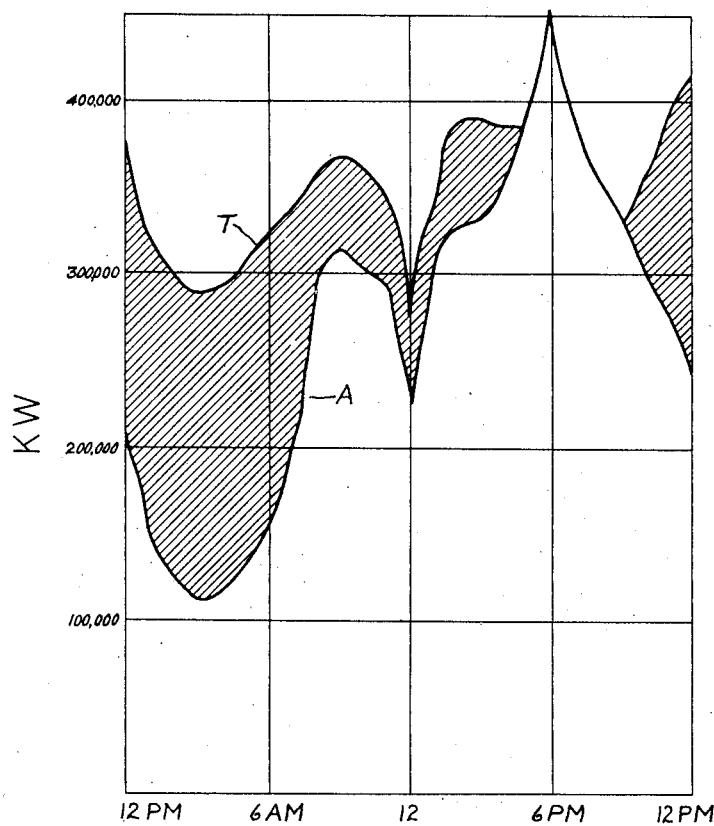

In the accompanying drawings, Fig. 1 diagrammatically illustrates a power distribution system having an electric heating load for utilizing the off peak capacity thereof in accordance with the present invention. Figure 2 is a diagram showing a typical load curve of such a distribution system with the electric heating load combined with the ordinary power and lighting load so as to maintain the total load substantially equal to the normal capacity of the system. Fig. 3 is a diagrammatic representation of a improved form of electric apparatus for domestic house heating and water heating service. Fig. 4 is a representation of an electric water heating apparatus used in conjunction with the ordinary coal, oil or gas house heating apparatus in the winter time and operated electrically in the summer time. Fig. 5 is a circuit diagram of the automatic control apparatus adapted for automatically connecting both the electric house heating and electric water heating devices shown in Fig. 3 to the distribution system in order to accumulate heat in the heat storage mass. Fig. 6 is a circuit diagram of the control apparatus employed for discharging the heat from the heat storage mass.

In Fig. 1 the generator station 10 indicated diagrammatically in the drawings by the circle is connected to supply a multiplicity of current consuming units such as the residences, stores, factories, etc. of a community represented diagrammatically as the current consuming units A1 to A12, B1 to B7, and C1. The units A1 to A12 are intended to represent customers consuming current principally for lighting and power service such as the ordinary house or factory. The units B1 to B7 represent customers using current not only for light and power but also for electrically heating water for domestic or other purposes. The unit C1 represents a customer using electricity entirely for light, power, water heating and house or building heating. It will be understood that only a portion of the total number of customers or units supplied from the electric power distribution system is represented diagrammatically in the drawings.

With a distribution system supplying customers using current simply for light and power such as the units A1 to A11, as is now ordinarily the case in central station practice, a typical load curve of the distribution system is represented by A in Fig. 2. From this curve it will be noted that there is minimum load on the system during the early hours of the morning, as for example, from one o'clock to six o'clock in the morning. The load demand then steadily increases after six o'clock in the morning and reaches a minor peak from nine to eleven o'clock in the morning. The customary noon-day cessation of activities produces a falling off in the load which however again increases in the afternoon to a maximum value around 6 p. m. and then tapers off through the evening and early part of the night to the minimum value which obtains during the early morning hours. With such a load curve it will be evident that the generating capacity and also the maximum current distributing capacity of the system is used only for a relatively short period of time, the load during the remaining time being materially less than the normal capacity of the system.

In order to increase the load factor of the system a sufficient number of units B are arranged to take current for water heating purposes during the summer time and thereby effectively utilize the off peak capacity of the system. For example, a number of the units B1 to B6 are arranged to take the block of power indicated in the shaded portion of diagram of Fig. 2 from the hours of 9 p. m. to 4 p. m. or 19 hours out of the 24. In this way the widely variable light and power load and the electric water heating loads are combined to produce a total load on the system indicated by the curve T in Fig. 2, which is more nearly equal to the normal capacity of the system. The difference between the load curves A and T indicated by the shaded portion represents energy consumed without requiring any additional generating or distributing equipment over that required to supply the maximum demand for the load A alone.

During the winter months the water heating load of units B1 to B6 is replaced to a large degree by an electric house heating load of equivalent value. Thus, the required number of the energy consuming units C are arranged to take current from the distribution system 10 in substantially the same manner as the water heating units. Consequently, the off peak energy throughout the whole year may be sold at a materially lower rate than that forming the maximum load demand so as to render the cost of electric water heating and electric house heating comparable economically with the ordinary coal, oil or gas systems now in use.

Fig. 3 shows the electrical installation in a typical one of the units C utilizing electrical energy for both building heating and for water heating purposes. In this figure the incoming supply lines 20 furnish current to the lighting circuits 21 and also the other domestic electrical appliances such as the electric range 22, electric refrigerator 23, and the electric iron 24. In addition, provision is made for electrically heating the house during the winter months.

The electric house heating apparatus in the form shown diagrammatically in Fig. 3 of the drawings is adapted for a hot air heating system and comprises one or more heat storage tanks 25 which are filled with water or other good heat storage material, and arranged to be heated by the electric heaters 26, preferably of the encased immersion type but which may be of any other suitable type. The heating tanks 25 are enclosed within the air heating room 27, preferably located in the basement of the house as shown, and provided with good heat insulating walls 28 formed of cork, or other good heat-insulating material of sufficient thickness effectively to prevent loss of heat from the air heating room.

In order to increase the heating efficiency, the house also preferably is provided with suitable heat insulated walls and ceiling, as indicated in Fig. 3, although these may be omitted if desired. The air-heating room 27 provides a relatively large hot air reservoir in the air space between the heat storage tanks 25 and the walls of the rooms. The air is drawn from the rooms in the house through the floor register 29 and circulated preferably through a duct not shown to the heating room 27 so as to absorb heat from the heat storage tanks 25 and is then returned to rooms of the house through the hot air conduits 30 and registers 31 by means of the blower 32. This blower is driven by the electric motor 33 and the operation of the latter is controlled by the room thermostat 34 to maintain the desired house temperature.

As shown in Fig. 3, electric water heating apparatus is provided for supplying hot water to meet the service requirements of the house during both winter and summer. The hot water heater tank 40 is conveniently located in the house, preferably in the basement along with the electric house heating apparatus, and provided with an electric heating element 41 which may be of the immersion type similar to that employed for heating the storage tanks 25, although in this case other suitable types also may be employed if desired. For the sake of clarity in the drawings the water supply and distribution piping has been omitted, but it will be understood that these are in accordance with the usual practice.

The automatic control of the energization of the electric heating elements 26 for the house heating apparatus and also the electric heating element 41 for the water heating apparatus so as to receive energy from the power distribution system only during the off peak load periods may be accomplished by the control apparatus illustrated diagrammatically in Fig. 5. In this figure the electric house heating elements 26 and the electric water heating elements 41 are illustrated as three phase star-connected resistors although single phase heaters may be used if necessary. The electromagnetic switch 50 and the manually operable disconnecting switch 51 control the connection of the electric house heating element 26 to the three phase power supply lines L1, L2, L3, while the electromagnetic switch 52 and the manually operable disconnecting switch 53 control the connection of the electric water heating element 41. The operation of the electromagnetic switches 50 and 52 is controlled by the automatic electro-responsive timing device 54 in conjunction with the automatic pressure switch 55 and the automatic thermostatic switch 56. As indicated diagrammatically in Fig. 3, the automatic pressure switch 55 is connected to the water storage tanks 25 so as to be responsive to the pressure developed therein upon the heating of the water. Likewise, the automatic thermostatic switch 56 is associated with the hot water heating tank 40 so as to be responsive to the temperature therein.

The automatic timing device 54 in the preferred form shown in Fig. 5 is of the synchronous type. This device comprises a rotatable induction disk 57 and an energizing winding 58 for the magnetic core 58' between the poles of which induction disk 57 rotates. The winding 58 is connected to be energized from one of the alternating current supply lines through disconnecting switch 59. The rotatable induction disk 57 is connected to drive through suitable speed reducing gearing 60 the cam shaft 61 having a pair of adjustable cams 62 and 63 thereon. These cams cooperate with the roller 64 on the pivoted switch contact 65 so as to close and open the contact at predetermined time intervals. Thus, one of the cams, 62 or 63, may be adjusted to close the switch contact 65 at a certain hour of the day or night, while the other cam may be adjusted to open the switch at any predetermined hour of the day or night. It will be understood that other forms of synchronous motor timing devices may be employed if desired.

The circuit controlled by the time switch contact 65 extends through each of the selective switches 66 and 67, switch 66 being arranged when closed to extend the circuit through the automatic pressure switch 55 and the automatic winding of the electromagnetic switch 50, and the switch 67 being arranged to extend the circuit through the automatic thermostatic switch 56 and the operating winding of the electromagnetic switch 52.

The operation of the automatic heat charging control for the electric house heating apparatus and also the electric water heating apparatus shown in Fig. 3 is as follows: With the manually operable disconnecting switches 51, 53, 59, 66 and 67 operated from the open position in which they are shown to the closed position, the motor element of the automatic timing device is set into continuous operation to rotate the cam shaft 61. Also the electromagnetic switch 50 is energized through the circuit extending through the disconnecting switch 59, the contact 65 of the timing device, the disconnecting switch 66 and the automatic pressure switch 55. Likewise, the operating winding of the electromagnetic switch 52 is energized through the disconnecting switch 67 and the automatic thermostatic switch 56. The resulting closure of the electromagnetic switches 50 and 52 connects the electric heating elements 26 and 41 to be energized from the three phase supply lines L1, L2, L3.

It will be understood that the adjustment of the cams 62, 63, of the timing device 54 is such that the electric heating elements 26 and 41 are connected to the supply lines only during the normal off peak load periods, and are automatically disconnected from the supply lines during normal load periods. Thus, at the predetermined time determined by the rotation of the cam shaft 61, the contact 65 is opened thereby deenergizing both of the electromagnetic switches 50 and 52 and disconnecting the heating elements 26 and 41 from the supply lines. Furthermore, if at any time sufficient heat has been imparted to the heat storage tank 25 by operation of the electric heating element 26 to raise the temperature, and consequently the pressure in the tanks, to the value at which the automatic pressure switch 55 is adjusted to operate, the electromagnetic switch 50 is deenergized by the opening of the contacts of pressure switch 55 independently of the operation of the automatic timing device 54. Then in case sufficient heat is withdrawn from the heat storage tanks 25 by operation of the blower so as to reduce the pressure, switch 55 automatically recloses and thereby reenergizes the electromagnetic switch 50 as long as the timing device 54 maintains its contact 65 in the closed position during the off peak load period.

The automatic thermostatic switch 56 functions in a similar manner to automatically deenergize and reenergize the electromagnetic switch 52 independently of the timing switch 54 whenever the temperature of the water heating tanks 40 varies above and below a predetermined value during the off peak heating period which the timing switch is adjusted to provide.

In case a graduated application of the heating load is desired in order more effectively to utilize the off peak capacity of the generating and distributing system, additional cam switches may be mounted on the timing cam shaft 61 and arranged to energize and deenergize different portions of the electric heating load at different times. Thus the water heater may be given a charging period different from that of the house heater or the heater units used in either the water heater or the house heater may be divided into groups and one group arranged to be energized during a certain period while the remaining groups are energized during a different period. In this way it is possible to have the combined heating and light and power loads approximate more closely to the normal load capacity of the generating and distributing system.

The heat stored in the tanks 25 and also in the water heater 40 during the off peak load periods of the power supply lines as determined by the timing switch 54 is available for use at any time irrespective of whether the heating elements 26 and 41 are energized or not. Thus, with the heat storage tanks 25 charged with heat during the night when the off peak load period of the supply system ordinarily occurs and also when the house heating requirements ordinarily are at a minimum, the heat is available to be distributed from the tanks 25 by operation of the motor driven blower 32 throughout the entire day. This is also true of the water heat storage tank 40.

The thermostatic control for the motor driven blower is shown in Fig. 6, and comprises a timing switch 70, the room thermostat 34 and the electromagnetic line contactor 71 for controlling the energization of the driving motor 33 for the blower. The time switch may be similar in construction and operation to the timing switch 54 previously described or preferably may employ the same synchronous timing motor with an additional set of timing cams and cooperating contacts in the manner indicated in Fig. 6. It will be observed that the room thermostat 34 is of the two-tongue type having the adjustable double contact thermostatic element 72 for controlling the operation of motor 33 during the night and the similar thermostatic element 73 for controlling the operation of the motor during the day. Thus, the thermostatic element 72 may be adjusted to maintain the house temperature between certain limits during the night, while the thermostatic element 73 may be adjusted to maintain the temperature between higher limits during the day. The shifting of the control from one thermostatic element to the other is automatically effected by the contact 74 of the synchronous timing switch 70.

The operation of the thermostatic control arrangement for distributing the heat from the heat storage tanks 25 is as follows: With the disconnecting switch 75 closed the operating winding of the timing motor 70 is energized and the cam shaft 76 is set into continuous rotation. As shown, the contact 74 of the time switch is in position to place the operation of the motor 33 driving the blower 32 under the control of the night thermostatic element 72 and the motor line switch 71 is in the open position, thereby indicating that the temperature of the rooms of the house are within the limits for which the night thermostat 72 is adjusted. If the temperature of the house should fall, the thermostatic element 72 moves to engage its right hand contact thereby connecting the operating winding of the motor line switch 71 to be energized from the secondary winding S of the transformer T, the circuit extending through the contact 74 of the time switch. The primary winding of transformer T is energized directly from one phase of the supply lines through the disconnecting switch 75. The resulting closure of line switch 71 sets the motor 33 into operation to drive the blower 32 and thereby circulate air from the air-heating room 27 through the house registers 31. Upon closure of the motor line switch 71 the primary winding P1 of the transformer T1 is energized along with the motor 33. As the secondary winding S1 of transformer T1 is permanently connected to the operating winding of the line contactor, the latter remains energized even though the thermostatic element 72 disengages its right hand contact and thereby interrupts the circuit from the secondary winding S of the transformer T.

When the operation of the motor driven blower has distributed sufficient heat from the storage tanks 25 to raise the room temperature so as to cause operation of the thermostatic element 72 into engagement with its left hand contact, the secondary winding S1 of transformer T1 is short circuited thereby effectively deenergizing the operating winding of line switch 71. This results in the opening of the line switch to stop further operation of the motor driven blower.

Thus, throughout the night the house temperature is maintained at the desired value, while at the same time a large amount of heat is being accumulated and stored in the heat storage tanks 25 by energization of the heating elements 26 during the period of off peak load on the distribution system. This stored heat is available to be distributed by the automatic thermostatic control system as required to maintain the house temperature at the desired value entirely independently of the heating periods. In accordance with the adjustment of the cams of the automatic timing switch 70 the contact 74 is shifted to transfer the control of the operation of the blower motor 33 from the night thermostat 72 to the day thermostat 73. The operation in starting and stopping the motor 33 under the control of the day thermostat 73 is precisely the same as that described in connection with the night thermostat 72.

Thus, it will be seen that my present invention not only provides an efficient and practical arrangement of the electric house and building heating and electric water apparatus but also enables the off peak load capacity of the generating station and distributing system supplying energy thereto to be utilized at a greater efficiency than is now ordinarily obtained.

What I claim as new and desire to secure by Letters Patent of the United States, is:

1. An electric house heating system comprising a container for a fluid mass having a relatively large heat storage capacity, an electric heater associated with said container for heating said mass, a heat insulating casing surrounding said container with an air space therebetween, an air conduit extending from said casing for distributing the heat from said storage mass to the house, an electrically operated blower for circulating air in the air space between said container and said casing, automatic time switch mechanism for connecting said electric heating means with an electric power distribution system during predetermined off peak load periods, and thermostatic means responsive to the house temperature for controlling the operation of said blower.

2. An electric house heating system comprising a tank having water therein, an electric heater inserted in said tank for heating the water, a heat insulated room surrounding said tank and providing a relatively large air reservoir around said tank, a conduit system for distributing the heated air from said heat insulated room to the rooms of the house, an electric motor driven blower for circulating the air through said conduit system, automatic time switch mechanism for connecting said heating means with an electric power distribution system during predetermined off peak load periods, and thermostatic switch mechanism operable in response to predetermined variations in the house temperature for starting and stopping said motor driven blower.

3. An electric house heating system comprising a container for a heat storage medium having a relatively large heat storage capacity, electric heating means adapted to be connected to a power distribution system for heating said heat storage medium, a switch responsive to predetermined temperature conditions of said storage medium to disconnect said heating means from said power distribution system, a heat insulating casing surrounding said container with an air space therebetween, distributing means connected to said casing for distributing the heat from said storage medium to the house, motor driven circulating means for circulating air in the air space between said container and said casing and through said distributing means, and electrically operated means responsive to the house temperature for energizing said motor driven circulating means.

4. An electric house heating system comprising a heat storage mass, electric heating means therefor, automatic time switch mechanism for connecting said heating means with an electric power distribution system during predetermined off-peak load periods, a switch responsive to predetermined temperature conditions of said storage mass to disconnect said heating means from said power distribution system independently of the operation of said time switch mechanism, an insulating casing surrounding said heat storage mass with an air space therebetween and a motor driven circulating means for circulating air over said heat storage mass, and thermostatic means responsive to the house temperature for controlling the said circulating means.

In witness whereof I have hereunto set my hand this 20th day of February, 1929.

CHESTER I. HALL.